United States Patent
Cannon et al.

(10) Patent No.: US 8,103,959 B2
(45) Date of Patent: Jan. 24, 2012

(54) GESTURE EXCHANGE VIA COMMUNICATIONS IN VIRTUAL WORLD APPLICATIONS

(75) Inventors: Ulysses L. Cannon, Durham, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 12/349,598

(22) Filed: Jan. 7, 2009

(65) Prior Publication Data

US 2010/0174617 A1 Jul. 8, 2010

(51) Int. Cl.
G06F 3/00 (2006.01)
G06F 3/048 (2006.01)

(52) U.S. Cl. ......... 715/753; 715/748; 715/751; 715/757

(58) Field of Classification Search .................. 715/748, 715/751, 753, 757
See application file for complete search history.

(56) References Cited

U.S. PATENT DOCUMENTS

| 5,566,291 | A | | 10/1996 | Boulton et al. | |
|---|---|---|---|---|---|
| 5,835,087 | A | | 11/1998 | Herz et al. | |
| 5,880,731 | A | * | 3/1999 | Liles et al. | 715/758 |
| 5,884,029 | A | * | 3/1999 | Brush et al. | 709/202 |
| 6,904,410 | B1 | | 6/2005 | Weiss et al. | |
| 6,954,728 | B1 | | 10/2005 | Kusumoto et al. | |
| 7,209,895 | B2 | | 4/2007 | Kundtz et al. | |
| 7,249,139 | B2 | | 7/2007 | Chuah et al. | |
| 7,269,794 | B2 | * | 9/2007 | Martinez et al. | 715/758 |
| 7,713,116 | B2 | | 5/2010 | Keam et al. | |
| 2002/0059120 | A1 | * | 5/2002 | Milton | 705/28 |
| 2003/0014423 | A1 | * | 1/2003 | Chuah et al. | 707/102 |
| 2003/0036944 | A1 | | 2/2003 | Lesandrini et al. | |
| 2005/0223328 | A1 | * | 10/2005 | Ashtekar et al. | 715/706 |
| 2006/0288041 | A1 | | 12/2006 | Plastina et al. | |
| 2007/0113181 | A1 | * | 5/2007 | Blattner et al. | 715/706 |
| 2007/0143128 | A1 | | 6/2007 | Tokarev et al. | |
| 2008/0215975 | A1 | | 9/2008 | Harrison et al. | |
| 2009/0174702 | A1 | | 7/2009 | Garbow et al. | |
| 2009/0285483 | A1 | | 11/2009 | Guven et al. | |
| 2009/0307608 | A1 | | 12/2009 | Kalasapur et al. | |
| 2010/0138316 | A1 | | 6/2010 | Connors et al. | |
| 2010/0275141 | A1 | | 10/2010 | Scherpa et al. | |
| 2011/0126122 | A1 | | 5/2011 | Forman et al. | |

OTHER PUBLICATIONS

Kelly's VP Vault Copyright 2000.*
U.S. Appl. No. 12/349,586, Specification, Jan. 7, 2009.
U.S. Appl. No. 12/349,586, First Office Action, Jul. 19, 2011.

* cited by examiner

Primary Examiner — Adam M Queler
Assistant Examiner — Andrea Long
(74) Attorney, Agent, or Firm — Law Office of Jim Boice

(57) ABSTRACT

A method, system and computer-readable medium are disclosed for exchanging gestures in a virtual world application. In one embodiment, the virtual world application determines whether a first avatar has a gesture exchange function enabled. If so, the virtual world application displays words communicated by a first user to a second user during the communication session and identifies a keyword among the communicated words corresponding to a gesture in a user inventory of the first avatar.

20 Claims, 4 Drawing Sheets

GESTURE EXCHANGE VIA COMMUNICATIONS IN VIRTUAL WORLD APPLICATIONS

BACKGROUND OF THE INVENTION

A virtual world (such as Second Life by Linden Research, Inc.) is a computer-based simulated environment intended for its users to inhabit and interact via avatars. Avatars are computer representations of the user typically depicted as textual, two-dimensional, or three-dimensional graphical representations. Some, but not all, virtual worlds allow for multiple users.

The computer accesses a computer-simulated world and presents perceptual stimuli to the user, who in turn can manipulate elements of the modeled world to experience a "telepresence" to a certain degree. Such modeled worlds may appear similar to the real world or may alternatively depict fantasy worlds. The modeled world may simulate rules based on the real world or a fantasy world. Example rules include gravity, topography, locomotion, real-time actions, and communication. Communication between users has ranged from text, graphical icons, visual gesture, sound, and even communication forms using touch and balance senses.

Massively multiplayer online games commonly depict a world similar to the real world, with real world rules and real-time actions, and communication. Communication is usually textual, with real-time voice communication using voice over IP (VOIP) also possible. Virtual worlds are not limited to games but, depending on the degree of immediacy presented, can encompass computer conferencing and text based chat rooms. Sometimes, emoticons or 'smilies' are available, to show feeling or facial expression. Emoticons often have a keyboard shortcut.

Within Second Life, for example, there are two main methods of text-based communication: local chat and global instant messaging (IM). Chatting is used for public localized conversations between two or more avatars and can be "heard" by avatars that are within twenty virtual meters of each other. IM is used for private conversations, either between two avatars or between the members of a group. Unlike chatting, IM communication does not depend on the participants being within a certain distance of each other. In addition, audio communication via VOIP between users is also available.

Gestures are assets that can trigger animations from the user interface within virtual word applications. In Second Life, for example, gestures can be triggered when the user types pre-defined function keys or keywords (such as typing "/bow" to perform a bow), where keywords can be used in lieu of a function key to make the user's avatar execute the associated animation. What is needed is a way for a user to easily share or exchange gestures in the user's inventory with other users.

BRIEF SUMMARY OF THE INVENTION

The present invention provides a method, system and computer-readable medium for exchanging gestures in a virtual world application between a first avatar corresponding to a first user of the virtual world application and a second avatar corresponding to a second user of the virtual world application. In one embodiment, the virtual world application determines whether the first avatar has a gesture exchange function enabled. In response to a determination that the first avatar has a gesture exchange function enabled, the virtual world application displays words communicated by the first user to the second user during the communication session and identifies a keyword among the communicated words corresponding to a gesture in a use inventory of the first avatar. The virtual world application displays a user-selectable indication to the second user to indicate that a gesture corresponding to the keyword is available for exchange. In response to the second user selecting the user-selectable indication with an input device, the virtual world application determines whether the second user would like to see a demonstration of the gesture corresponding to the selected keyword. In response to a determination that said second user would like to see a demonstration, the virtual world application demonstrates the gesture to the second user and determines whether the second user would like receive a copy of the gesture from the first user. In response to a determination that the second user would like to receive a copy of the gesture from the first user, the virtual world application saves a copy of the gesture in a user inventory of the second user. In response to a determination that the first avatar does not have a gesture exchange function enabled, the virtual world application displays a plurality of words communicated by the first user to the second user during the communication session.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a best mode of use, further purposes and advantages thereof, will best be understood by reference to the following detailed description of an illustrative embodiment when read in conjunction with the accompanying drawings, where:

DETAILED DESCRIPTION OF THE INVENTION

An illustrative embodiment of the present invention is directed to a method, system and computer-readable medium for exchanging gestures between users via communications in virtual world applications. The present invention can take the form of an entirely hardware embodiment, an entirely software embodiment or an embodiment containing both hardware and software elements. In an illustrative embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

The medium can be an electronic, magnetic, optical, electromagnetic, infrared or semiconductor system, apparatus or device or a propagation medium. Examples of a computer-readable medium include a semiconductor or solid state memory (e.g., flash drive memory), magnetic tape, a removable computer diskette, a random access memory (RAM), a read-only memory (ROM), a rigid magnetic disk (e.g., a hard drive) and an optical disk. Current examples of optical disks include compact disk-read only memory (CD-ROM), compact disk-read/write (CD-R/W) and Digital Versatile Disk (DVD).

Figure 1:
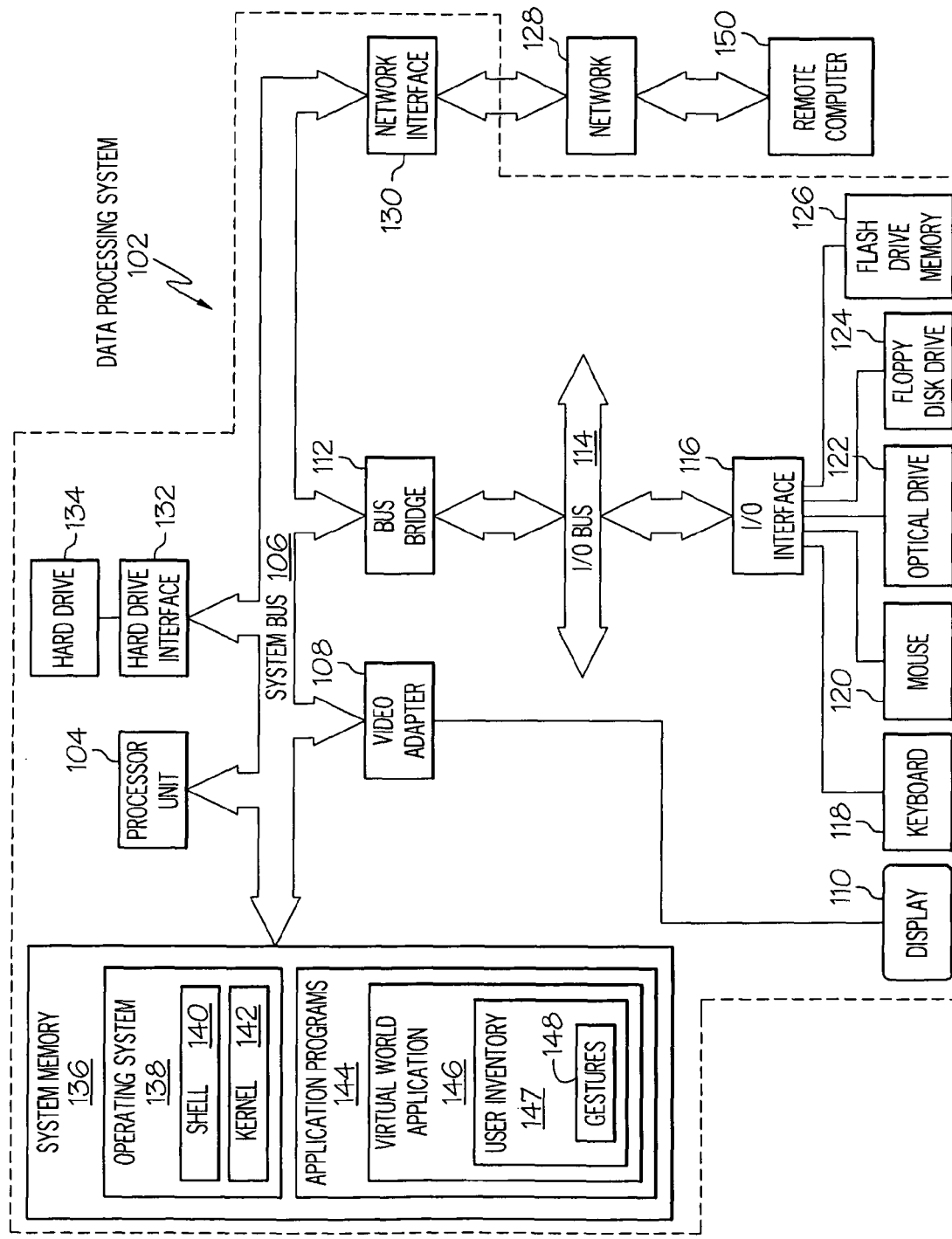
FIG. 1 is a block diagram of an exemplary data processing system in which the present invention may be implemented.

Referring now to the drawings, wherein like numbers denote like parts throughout the several views, FIG. 1 shows a block diagram of a data processing system suitable for storing and/or executing program code in accordance with one or more embodiments of the present invention. Data processing system 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, an optical disk drive 122, a floppy disk drive 124, and a flash drive memory 126. The format of the ports connected to I/O interface 116 may be any known to those skilled in the art of computer architecture, including but not limited to Universal Serial Bus (USB) ports.

Data processing system 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Software deploying server 150 may utilize a similar architecture design as that described for data processing system 102.

A hard drive interface 132 is also coupled to system bus 106. Hard drive interface 132 interfaces with hard drive 134. In a preferred embodiment, hard drive 134 populates a system memory 136, which is also coupled to system bus 106. Data that populates system memory 136 includes an operating system (OS) 138 of data processing system 102 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include virtual world application 146, which enables data processing system 102 to communicate with remote computer 150 over network 128. Virtual world application 146 includes user inventory 147, which is used to store items that are associated with an avatar of a user of virtual world application 146. User inventory 147 includes gestures 148, which can be exchanged with a user of remote computer 150 in accordance with one or more embodiments of the present invention.

The hardware elements depicted in data processing system 102 are not intended to be exhaustive, but rather are representative to highlight essential components required by the present invention. For instance, data processing system 102 may include alternate memory storage devices such as magnetic cassettes, Digital Versatile Disks (DVDs), Bernoulli cartridges, and the like. These and other variations are intended to be within the spirit and scope of the present invention.

Figure 2:
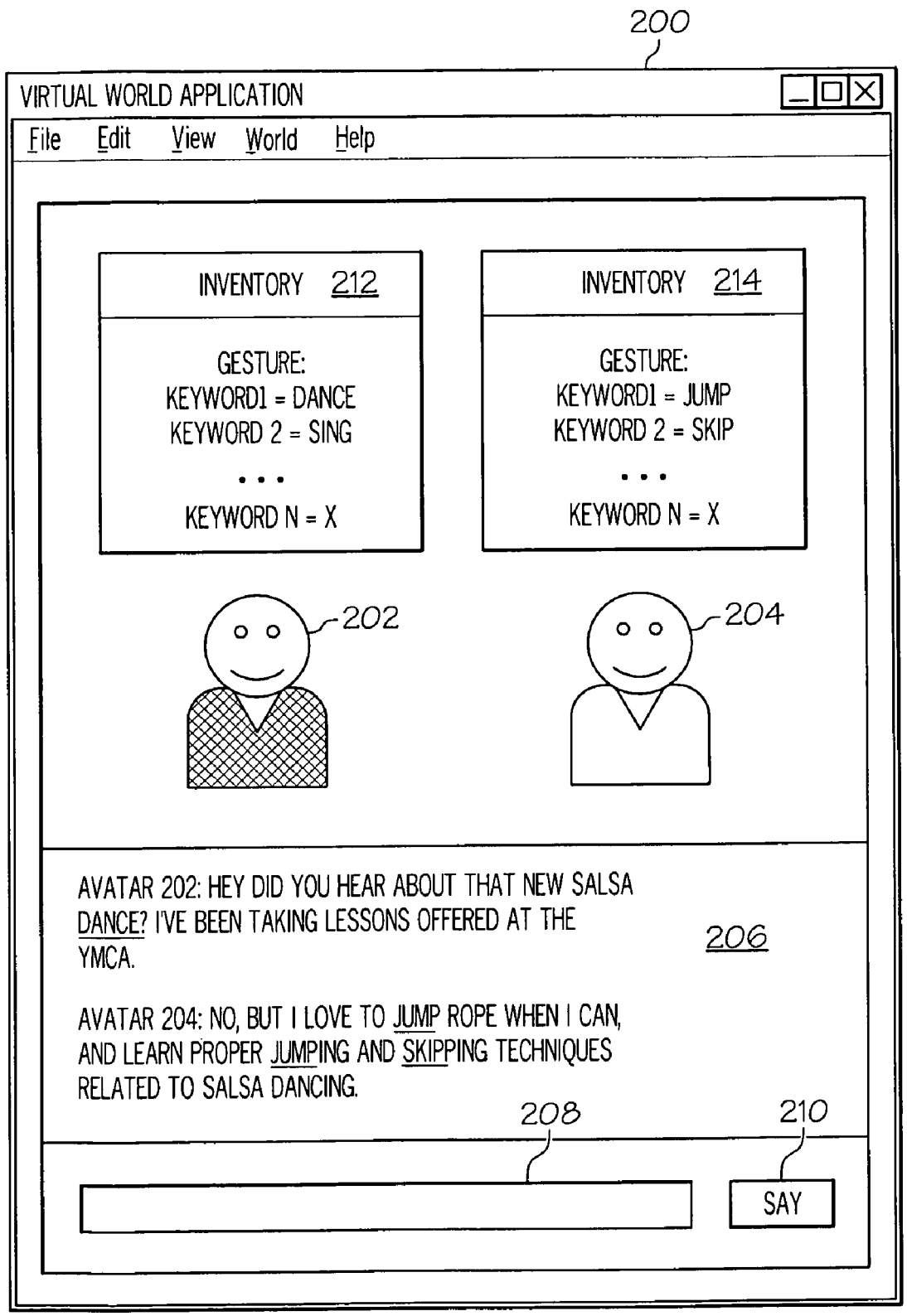
FIG. 2 shows a diagram of an exemplary virtual world application in which the present invention may be implemented.

With reference now to FIG. 2, a diagram of an exemplary user interface of a virtual world application is shown in accordance with one or more embodiments of the present invention. A user is engaged in a localized chat communication with a remote user using virtual world application 146. The user is represented by avatar 202. The remote user is represented by avatar 204. Virtual world application window 200 displays avatar 202 and avatar 204 to a user. A user enters text to be communicated with the remote user via text entry field 208 and transmits the text to the remote user by selecting "say" button 210. Text transmitted by either user may appear in chat window 206 in the order in which the text was transmitted, thereby enabling the users to engage in a dialog. Alternatively, the transmitted text may be displayed in proximity to the avatar corresponding to the user transmitting the text, to create the appearance that one avatar is speaking to the other within virtual world application 146.

Gestures 148 are stored in user inventory 147 as shown in FIG. 1. A list of gestures available to be performed by avatar 202 is displayed in inventory window 212. A list of gestures available to be performed by avatar 204 is displayed in inventory window 214. The user may set a user-selectable preference to enable gesture exchange functionality. When the gesture exchange functionality is enabled, gestures in user inventory 147 will be enabled for exchange with a remote user. When the gesture exchange functionality is not enabled, gestures in user inventory 147 will not be enabled for exchange with a remote user. When the gesture exchange functionality is enabled, virtual world application 146 parses text transmitted by a user to a remote user to identify keywords corresponding to a gesture in user inventory 147. If virtual world application 146 identifies a keyword in the text, virtual world application 146 displays a user-selectable indication to the remote user to indicate that a gesture corresponding to the identified keyword is available for exchange with the remote user. For example, as shown in FIG. 2, a user with a gesture exchange functionality enabled transmits the following text to a remote user, "Hey did you hear about that new salsa dance? I've been taking lessons offered at the YMCA." Virtual word application 146 identifies the word "dance" as a keyword for a gesture in user inventory 147 that enables avatar 202 to perform a dancing animation. Virtual world application 146 displays the world "dance" with a hyperlink that, when selected by the remote user, enables the remote user to receive and save the gesture corresponding to the "dance" keyword in the user inventory of the remote user. The gesture can be saved in the user inventory of the remote user for free, or the gesture can be saved in the user inventory of the remote user for a fee. For example, the remote user first pays the user who owns the gesture a fee comprising an amount of currency of the virtual world application 146. Upon successful payment of the fee, the gesture is saved in the user inventory of the remote user. Acquired gestures can be automatically enabled upon receipt, or disabled until the remote user manually activates the gesture.

While a hyperlink is used as an example, virtual world application 146 may display any type of user-selectable indication, including highlighting a word that the remote user can then hover over with a mouse pointer to select. Alternatively, virtual world application 146 may cache all identified keywords and display them to the remote user as a list. The list display is useful if the localized communication is rapid and the remote user is having difficulty keeping up with all of the identified keywords.

In one embodiment of the present invention, when the remote user selects the user-selectable indication, virtual world application 146 determines whether the remote user would like to see a demonstration of the gesture before saving the gesture to the user inventory of the remote user. If the remote would like to see a demonstration, the avatar of the remote user performs the gesture and virtual world application 146 determines whether the remote user would like to save the gesture, not save the gesture or see a demonstration again. Alternatively, the remote user can request a demonstration performed by the avatar of the user who owns the gesture. If the user accepts the request for a gesture demonstration, the avatar of the user performs a real-time demonstration for the remote user or provides a video of the gesture to the remote user. The owner of the gesture can predefine the number of requests for demonstration.

The present invention has been described in the context of a localized chat communication within virtual world application 146. However, the present invention is also applicable to instant messaging and voice-over-internet-protocol (VOIP) within virtual world application 146. For instant messaging, the request to demonstrate a gesture would not include a "real-time" response of the owning avatar. Instead, a video presentation of the gesture could be provided to the requester. This approach solves the problem of two avatars being in different locations within virtual world application 146, where a real-time demonstration by the owning avatar is not possible. For VOIP communication, virtual world application 146 would identify spoken words corresponding to keywords that represent gestures available for exchange, for example, by monitoring VOIP exchanges with speech to text processing. Virtual world application 146 would send a notification to the remote user that a gesture exchange is possible and display a list of all indentified keywords.

Figure 3:
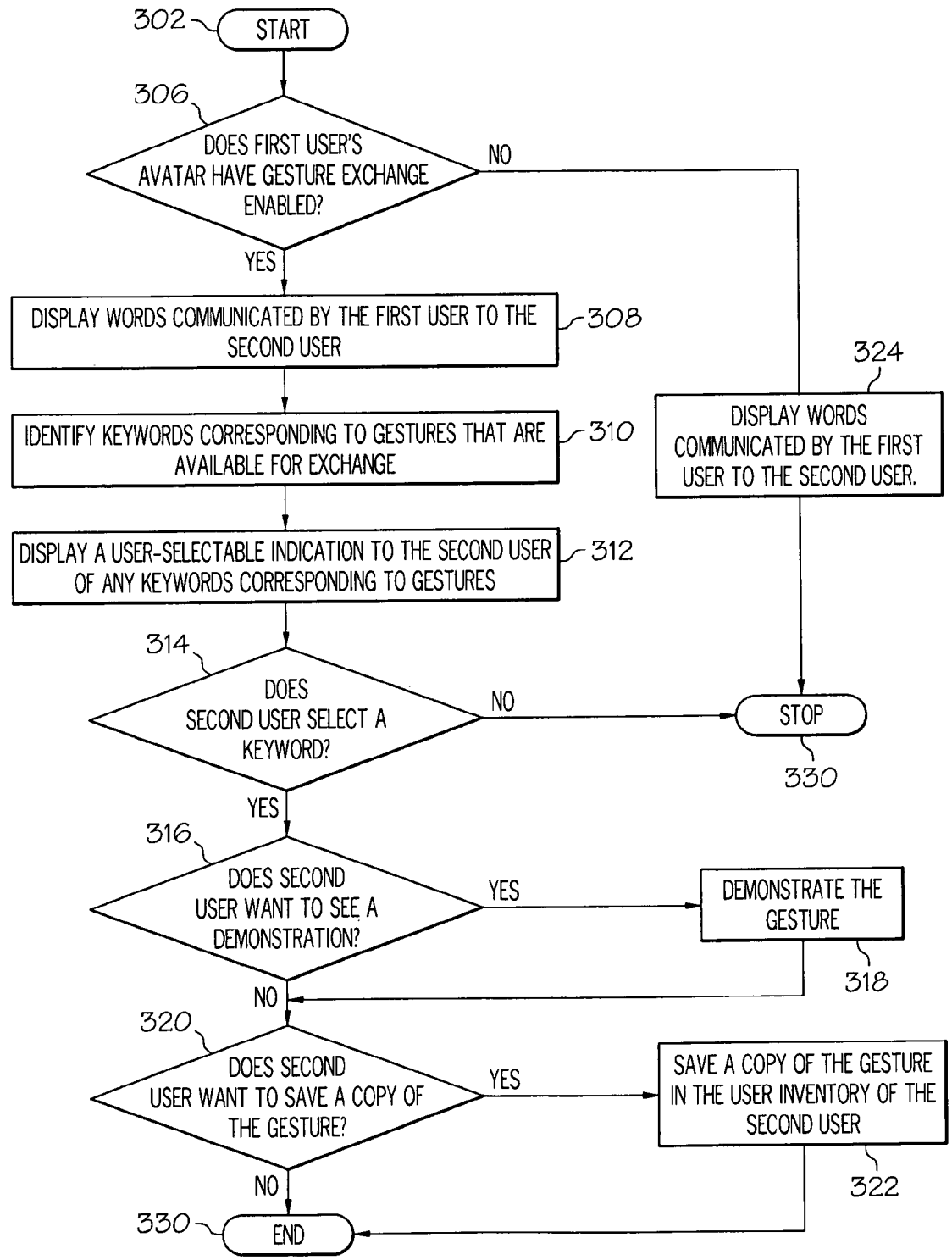
FIG. 3 shows a flowchart depicting a method for exchanging gestures between users via communications in virtual world applications, in accordance with one or more embodiments of the present invention.

With reference now to FIG. 3, a flowchart is shown depicting a method, in accordance with one or more embodiments of the present invention, for providing an improved virtual world application with gesture exchange function. The process starts at initiator 302. Virtual world application 146 initiates a communications session between two users (step 304). Virtual world application 146 determines whether an avatar corresponding to the first user has a gesture exchange function enabled (step 306). If the gesture exchange function is not enabled, virtual word application 146 displays words communicated by the first user to the second user (step 324) and the process ends at terminator 330. If the gesture exchange function is enabled, virtual word application 146 displays words communicated by the first user to the second user (step 308) and identifies keywords corresponding to gestures that are available for exchange within the displayed words (step 310). Virtual world application 146 displays a user-selectable indication to the second user of the identified keywords corresponding to gestures that are available for exchange (step 312) and detects whether the second user selects the user-selectable indication corresponding to a keyword (step 314). If the second user does not select a user-selectable indication, the process ends at terminator 330. If the second user does select a user-selectable indication, virtual world application 146 determines whether the second user would like to see a demonstration of the gesture (step 316). If the second user would like to see a demonstration of the gesture, virtual world application 146 demonstrates the gesture to the second user (step 318). Upon completion of step 318 or if the second user would not like to see a demonstration of the gesture, virtual world application 146 determines whether the second user would like to save of copy of the gesture in the user inventory 147 of the second user (step 320). If the second user would like to save of copy of the gesture in the user inventory 147 of the second user, virtual world application 146 saves a copy of the gesture in the user inventory of the second user (step 322). Upon completion of step 322 or if the second user would not like to save of copy of the gesture in the user inventory 147 of the second user, the process ends at terminator 330.

Figure 4:
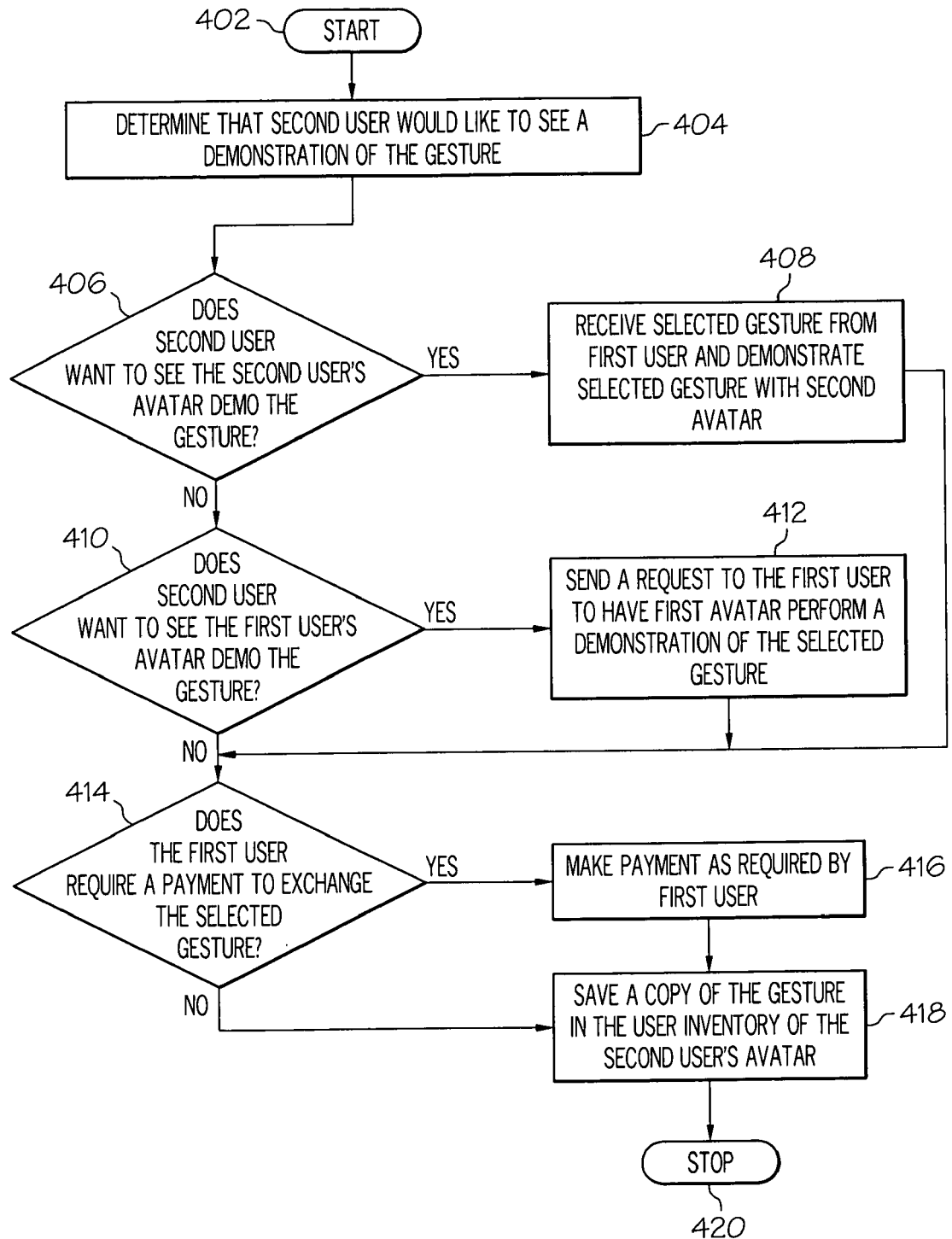
FIG. 4 shows a flowchart depicting a method for demonstrating gestures and making payments for gestures in accordance with one or more embodiments of the present invention.

With reference now to FIG. 4, a flowchart is shown depicting a method for demonstrating gestures and making payments for gestures in accordance with one or more embodiments of the present invention. The process begins at initiator 402. When the second user indicates that the second user would like to see a demonstration of the gesture (step 404), virtual world application 146 determines whether the second user would like to see the avatar of the second user perform a demonstration of the gesture (step 406). If the second user would like to see the avatar of the second user perform a demonstration of the gesture, virtual world application 146 receives the selected gesture from the first user and demonstrates the selected gesture with the avatar of the second user (step 408). If the second user would not like to see the avatar of the second user perform a demonstration of the gesture, virtual world application 146 determines whether the second user would like to request that the avatar of the first user perform a demonstration of the gesture (step 410). If the second user would like to request that the avatar of the first user perform a demonstration of the gesture, virtual world application 146 sends a request to the first user requesting that the avatar of the first user perform a demonstration of the selected gesture (step 412).

If the second user would not like to request that the avatar of the first user perform a demonstration of the gesture, or upon completion of step 408 or step 412, virtual world application 146 determines whether the first user requires payment to exchange the selected gesture with the second user (step 414). If the first user requires payment to exchange the selected gesture with the second user, virtual world application 146 makes the payment (e.g. Linden dollars in Second Life) as required by the first user (step 416). If the first user does not require payment to exchange the selected gesture with the second user, or upon completion of the payment in step 416, virtual world application 146 saves a copy of the gesture in the user inventory of the avatar of the second user (step 418). The process ends at terminator 420.

While the present invention has been particularly shown and described with reference to an illustrative embodiment, it will be understood by those skilled in the art that various changes in form and detail may be made therein without departing from the spirit and scope of the invention. Furthermore, as used in the specification and the appended claims, the term "computer" or "computer system" or "computing device" includes any data processing system including, but not limited to, personal computers, servers, workstations, network computers, mainframe computers, routers, switches, Personal Digital Assistants (PDA's), telephones, and any other system capable of processing, transmitting, receiving, capturing and/or storing data. The term "system" or "information system" includes a network of data processing systems.

The flowchart and diagrams in the Figures illustrate the architecture, functionality, and operation of possible implementations of systems, methods and computer program products according to various embodiments of the present invention. In this regard, each block in the flowchart or diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to illustrative embodiments thereof, it will be apparent that modifications and variations are possible without departing from the scope of the invention defined in the appended claims.

What is claimed is:

1. A computer-implemented method in a data processing system for exchanging gestures in a virtual world application between a first avatar corresponding to a first user of said virtual world application and a second avatar corresponding to a second user of said virtual world application, the computer-implemented method comprising:
    determining whether said first avatar has a gesture exchange function enabled;
    in response to a determination that said first avatar has a gesture exchange function enabled,
        displaying a plurality of words communicated by said first user to said second user during said communication session;
        identifying a keyword among said plurality of words corresponding to a gesture in a user inventory of said first avatar;
        displaying a user-selectable indication to said second user to indicate that said gesture corresponding to said keyword is available for exchange;
        in response to said second user selecting said user-selectable indication with an input device, determining whether said second user would like to see a demonstration of said gesture corresponding to said keyword;
        in response to a determination that said second user would like to see said demonstration, demonstrating said gesture to said second user;
        determining whether said second user would like receive a copy of said gesture from said first user;
        in response to a determination that said second user would like to receive said copy of said gesture from said first user, saving said copy of said gesture in a user inventory of said second user; and
    in response to a determination that said first avatar does not have said gesture exchange function enabled, displaying said plurality of words communicated by said first user to said second user during said communication session.

2. The computer-implemented method of claim 1, wherein said demonstrating further comprises:
    determining whether said second user would like to see said demonstration of said gesture performed by said second avatar; and
    in response to a determination that said second user would like to see said demonstration performed by said second avatar, performing said gesture by said second avatar.

3. The computer-implemented method of claim 1, wherein said demonstrating further comprises:
    determining whether said second user would like to request that said first avatar perform said demonstration of said gesture; and
    in response to a determination that said second user would like to request that said first avatar perform said demonstration of said gesture, sending a request to said first user to have said first avatar perform said demonstration of said gesture.

4. The computer-implemented method of claim 1, further comprising:
    determining whether said first user requires a payment to exchange said gesture with said second user;
    in response to said first user requiring said payment to exchange said gesture with said second user:
    making said payment;
    in response to the completion of said payment, saving said copy of said gesture in said user inventory of said second user; and
    in response to said first user not requiring said payment to exchange said gesture with said second user, saving said copy of said gesture in said user inventory of said second user.

5. The computer-implemented method of claim 1, wherein said communication session in said virtual world application is a localized chat communication.

6. The computer-implemented method of claim 1, wherein said communication session in said virtual world application is an instant messaging session.

7. The computer-implemented method of claim 1, wherein said communication session in said virtual world application is a voice-over-internet-protocol session.

8. A data processing system comprising:
a processor;
a memory coupled to said processor;
a virtual world application stored on said memory, wherein said virtual world application comprises computer-executable instructions for:
providing a communication session in a virtual world application between a first avatar corresponding to a first user of said virtual world application and a second avatar corresponding to a second user of said virtual world application;
determining whether said first avatar has a gesture exchange function enabled;
in response to a determination that said first avatar has a gesture exchange function enabled,
displaying a plurality of words communicated by said first user to said second user during said communication session;
identifying a keyword among said plurality of words corresponding to a gesture in a user inventory of said first avatar;
displaying a user-selectable indication to said second user to indicate that said gesture corresponding to said keyword is available for exchange;
in response to said second user selecting said user-selectable indication with an input device, determining whether said second user would like to see a demonstration of said gesture corresponding to said keyword;
in response to a determination that said second user would like to see said demonstration, demonstrating said gesture to said second user;
determining whether said second user would like receive a copy of said gesture from said first user;
in response to a determination that said second user would like to receive said copy of said gesture from said first user, saving said copy of said gesture in a user inventory of said second user; and
in response to a determination that said first avatar does not have said gesture exchange function enabled, displaying said plurality of words communicated by said first user to said second user during said communication session.

9. The data processing system of claim 8, wherein said computer-executable instructions for demonstrating further comprise computer-executable instructions for:
determining whether said second user would like to see said demonstration of said gesture performed by said second avatar; and
in response to a determination that said second user would like to see said demonstration performed by said second avatar, performing said gesture by said second avatar.

10. The data processing system of claim 8, wherein said computer-executable instructions for demonstrating further comprise computer-executable instructions for:
determining whether said second user would like to request that said first avatar perform said demonstration of said gesture; and
in response to a determination that said second user would like to request that said first avatar perform said demonstration of said gesture, sending a request to said first user to have said first avatar perform said demonstration of said gesture.

11. The data processing system of claim 8, wherein said virtual world application further comprises computer-executable instructions for:
determining whether said first user requires a payment to exchange said gesture with said second user;
in response to said first user requiring said payment to exchange said gesture with said second user:
making said payment;
in response to the completion of said payment, saving said copy of said gesture in said user inventory of said second user; and
in response to said first user not requiring said payment to exchange said gesture with said second user, saving said copy of said gesture in said user inventory of said second user.

12. The data processing system of claim 8, wherein said communication session in said virtual world application is a localized chat communication.

13. The data processing system of claim 8, wherein said communication session in said virtual world application is an instant messaging session.

14. The data processing system of claim 8, wherein said communication session in said virtual world application is a voice-over-internet-protocol session.

15. A non-transitory computer-readable storage medium encoded with a computer program product for exchanging gestures in a virtual world application between a first avatar corresponding to a first user of said virtual world application and a second avatar corresponding to a second user of said virtual world application that, when executed, causes control circuitry in a data processing system to perform the steps of:
determining whether said first avatar has a gesture exchange function enabled;
in response to a determination that said first avatar has a gesture exchange function enabled,
displaying a plurality of words communicated by said first user to said second user during said communication session;
identifying a keyword among said plurality of words corresponding to a gesture in a user inventory of said first avatar;
displaying a user-selectable indication to said second user to indicate that said gesture corresponding to said keyword is available for exchange;
in response to said second user selecting said user-selectable indication with an input device, determining whether said second user would like to see a demonstration of said gesture corresponding to said keyword;
in response to a determination that said second user would like to see said demonstration, demonstrating said gesture to said second user;
determining whether said second user would like receive a copy of said gesture from said first user;
in response to a determination that said second user would like to receive said copy of said gesture from said first user, saving said copy of said gesture in a user inventory of said second user; and
in response to a determination that said first avatar does not have said gesture exchange function enabled, displaying said plurality of words communicated by said first user to said second user during said communication session.

16. The non-transitory computer-readable storage medium of claim 15, wherein said instructions for demonstrating further comprise instructions for:
   determining whether said second user would like to see said demonstration of said gesture performed by said second avatar; and
   in response to a determination that said user would like to see said demonstration performed by said second avatar, performing said gesture by said second avatar.

17. The non-transitory computer-readable storage medium of claim 15, wherein said instructions for demonstrating further comprise instructions for:
   determining whether said second user would like to request that said first avatar perform said demonstration of said gesture; and
   in response to a determination that said second user would like to request that said first avatar perform said demonstration of said gesture, sending a request to said first user to have said first avatar perform said demonstration of said gesture.

18. The non-transitory computer-readable storage medium of claim 15, wherein said computer-readable medium further comprise instructions for:
   determining whether said first user requires a payment to exchange said gesture with said second user;
   in response to said first user requiring said payment to exchange said gesture with said second user:
      making said payment;
      in response to the completion of said payment, saving said copy of said gesture in said user inventory of said second user; and
   in response to said first user not requiring said payment to exchange said gesture with said second user, saving said copy of said gesture in said user inventory of said second user.

19. The non-transitory computer-readable storage medium of claim 15, wherein said communication session in said virtual world application is a localized chat communication.

20. The non-transitory computer-readable storage medium of claim 15, wherein said communication session in said virtual world application is a voice-over-internet-protocol session.

* * * * *